United States Patent [19]

Bouiller et al.

[11] 3,768,933

[45] Oct. 30, 1973

[54] FAN FOR GAS TURBINE UNIT

[75] Inventors: Jean Georges Bouiller, Brunov;
Louis Jules Bauger, Vanves;
Armand Jean-Baptiste Lacroix,
Itteville, all of France

[73] Assignee: Societe Nationale D'Etude Et De Construction De Moteurs D'Aviation, Paris, France

[22] Filed: June 17, 1971

[21] Appl. No.: 154,070

[30] Foreign Application Priority Data
June 22, 1970 France .......................... 7022919

[52] U.S. Cl. .................. 417/408, 415/77, 416/157, 60/226 A
[51] Int. Cl. ............................................ F04b 17/00
[58] Field of Search ..................... 417/408; 415/77, 415/79; 60/226 A, 226 R; 416/157

[56] References Cited
UNITED STATES PATENTS
3,673,802  7/1972  Krebs ............................ 60/226 R
3,199,773  8/1965  Stirling ............................. 415/77
3,549,272  12/1970  Bauger et al. .................. 417/79 X

*Primary Examiner*—C. J. Husar
*Attorney*—William J. Daniel

[57] ABSTRACT

A gas turbine unit, in particular for an aircraft turbojet engine, comprises a fan rotating coaxially in front of an axial flow compressor. The fan has an outer blading ring fixed to a rim attached to a hub of the fan through an inner blading ring, and the inner blades are pivotally attached, at the root and tip ends respectively, to the hub and to the rim about pivot axes parallel to the axis of rotation of the hub. The inner blades are all inclined in the same direction and at the same angle in relation to the hub circumference. The rim can thus expand freely under the effect of the centrifugal forces applied to it in operation by the outer blading, without local distortion and without the application of any bending stresses to the inner blades.

6 Claims, 5 Drawing Figures

Patented Oct. 30, 1973
3,768,933
3 Sheets-Sheet 1
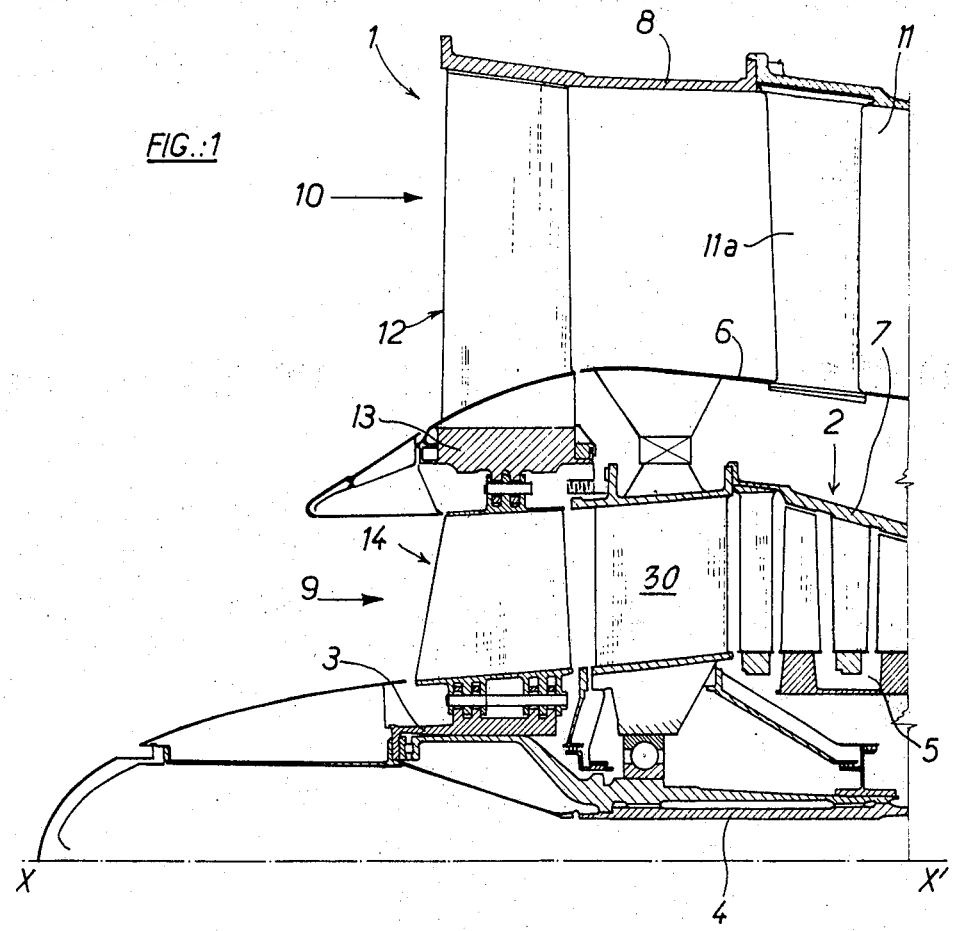
FIG.:1
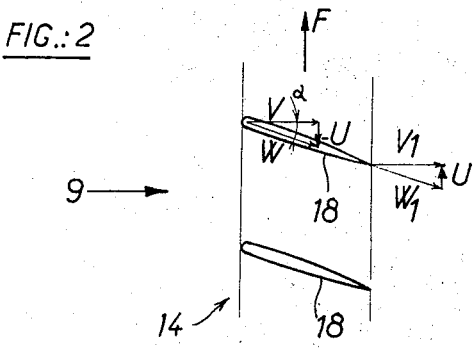
FIG.:2

Patented Oct. 30, 1973
3,768,933
3 Sheets-Sheet 2
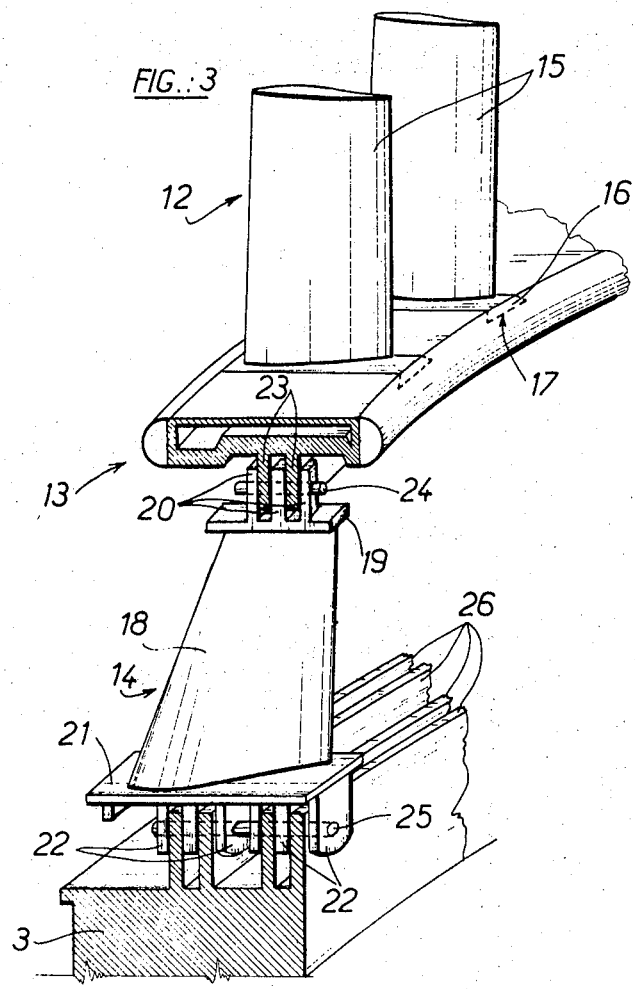
FIG.: 3
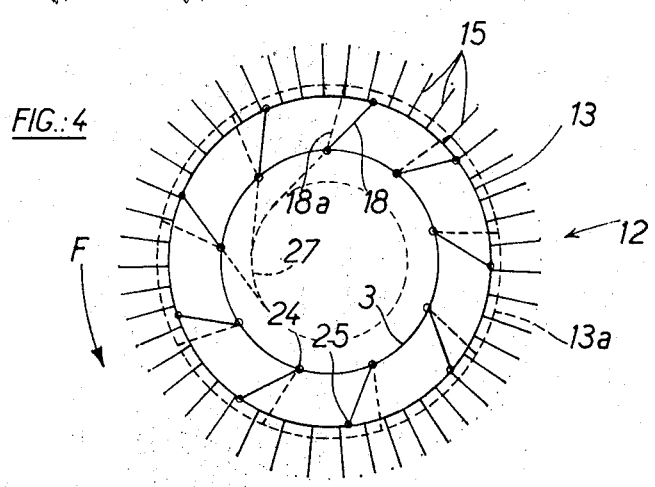
FIG.: 4

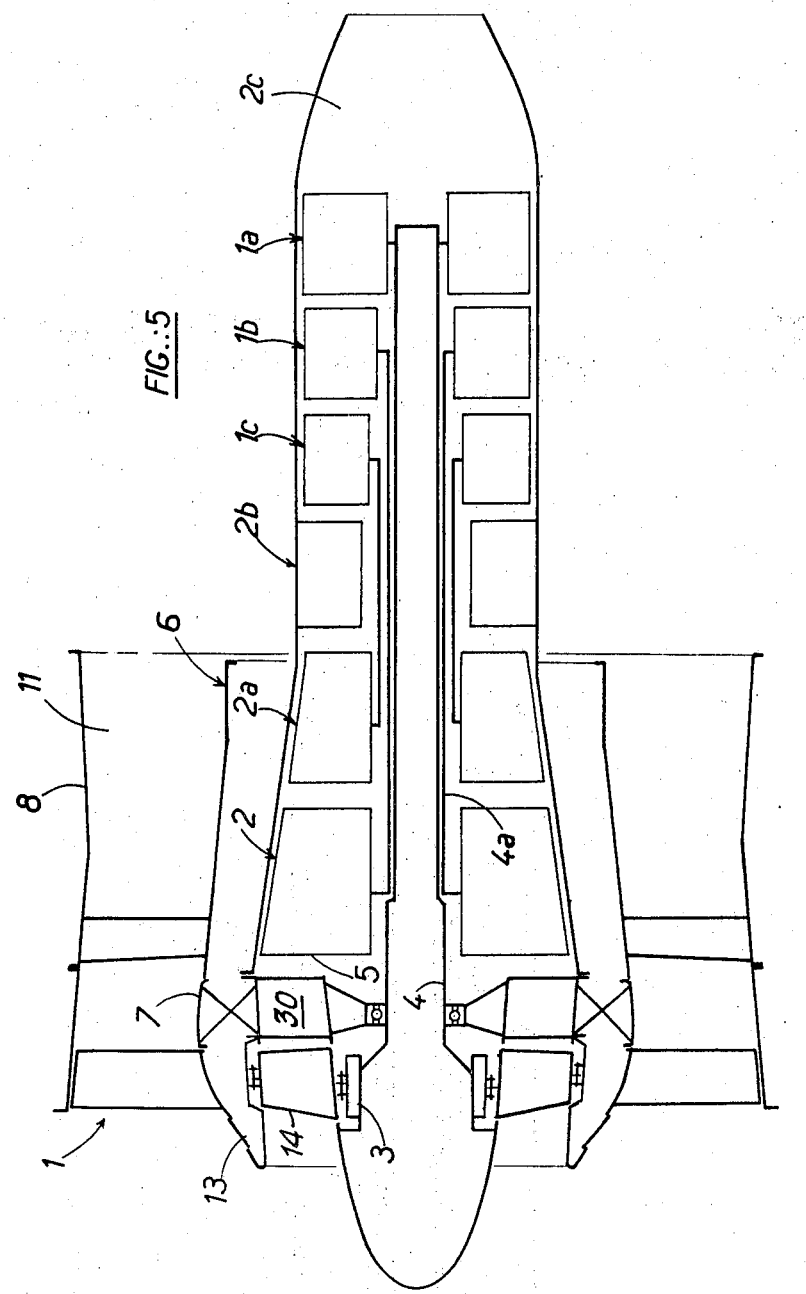

FAN FOR GAS TURBINE UNIT

This invention relates to gas turbine units comprising an axial flow compressor and a fan. It relates in particular to aircraft by-pass type gas turbine jet engines but is equally applicable to an industrial gaz turbine unit.

The chief purpose of a fan in such an aircraft engine is to supply an airflow, known as the secondary airflow, which passes around the exterior of the compressor casing in order to supply the engine with by-pass air. The central part of the fan is located upstream of the compressor and therefore generally supplies the latter with air which is already slightly compressed.

It is well-known, in particular in order to facilitate or render possible the attachment of fan blading comprising a large number of blades to a relatively small diameter hub, to split the blading into outer and inner blade rings which are separated by a rim. The roots of the outer blades are fixed to the rim and the latter is attached to the hub of the fan through a smaller number of blades constituting the inner blading. The rim is, of course, located as an extension of the compressor casing, in order that it does not disturb the flow.

In accordance with the present invention, the blades of the inner blading are articulated at root and tip respectively to the hub and to the rim, about axes parallel to that of the hub, and are similarly inclined in relation to the fan assembly, that is to say that the planes containing the two axes of articulation of one and the same blade are, in the rest condition, tangential to an imaginary cylinder coaxial with the hub.

In operation, the blades of the inner blading transmit the hub rotational torque to the rim. The latter extends elastically under the effect of the centrifugal forces applied to it by the outer blading, without applying any bending stress to the inner blades, which align themselves by pivoting about their articulation axes and without producing any local distortion of the rim. Due to the fact that the inner blades serve exclusively to transmit the torque, they operate substantially in tension and are not submitted to any other mechanical stress so that both the number and the mass of these blades can be reduced.

In accordance with one preferred feature of the invention, the inner blading is set to give a "transparency condition", that is to say so that in design conditions they produce no aerodynamic effect. As a result, the inner blades do not experience any aerodynamic stress at full load and this enables the mechanical strength, and therefore the mass of these blades, to be still further reduced.

This preferred feature furthermore has the advantage that the inner blading has no influence upon the airflow entering the compressor, at any rate in the neighbourhood of the design point, so that the control of the engine can in particular be simplified as the speed of the compressor can be regulated independently of that of the fan.

The description which now follows and which relates to the accompanying drawings is given solely by way of non-limitative example. It details the advantages of the invention and how they are achieved, and features contained both in the present text and in the drawings fall within the scope of the invention. In the drawings :

FIG. 1 is a half-axial section through the forward part of a by-pass type gas turbine jet engine with an axial compressor and fan, which embodies improvements in accordance with the invention ;

FIG. 2 is a velocity diagram illustrating the setting of inner blading of the fan ;

FIG. 3 is a partial perspective view, to a larger scale, illustrating the assembly of the fan blades; and FIG. 4 is a schematic transverse sectional view, on a small scale, illustrating the operation of the fan;

FIG. 5 is a diagrammatic illustration of a jet engine showing the general environment of the invention.

The jet engine illustrated diagrammatically in FIG. 5, the forward part of which is shown in FIG. 1, is of the three-spool type comprising a fan 1 located upstream of a low-pressure axial flow compressor 2 which is followed by a high-pressure axial flow compressor 2a. The fan 1, the compressor 2 and the high-pressure compressor 2a are respectively driven, in a conventional manner, by three turbines 1a, 1b, 1c arranged and in series flow downstream of a combustion chamber 2b which is supplied with combustion air by the compressors 2, 2a, the gases leaving the last turbine 1a being discharged through a nozzle 2c to form a propulsion jet. In the drawings, the hub 3 of the fan 1 is shown, this being fixed to a shaft 4 which is rotated by the final turbine 1a, and also shown is the rotor 5 of the low-pressure compressor 2 which is fixed to a shaft 4a coaxial to the shaft 4 and rotated by the corresponding turbine 1b. The reference 7 indicates the forward part of the compressor casing and 8 the forward part of the external fairing or nacelle of the engine.

During operation of the engine, the air entering at 9, at the front end of the engine, enters the fan 1, is then compressed by the compressor 2 and recompressed by the high-pressure compressor 2a, whilst the air entering the peripheral portion of the fan 1, at 10, is compressed by the latter and then flows into a diffuser 11a in an annular duct 11 defined between a fairing 6 surrounding the casing 7 and the fairing 8, in order in the normal manner to supply the jet engine with by-pass air.

The turbine 1a which drives the fan 1 is designed to rotate at a relatively low speed so that the fan has a moderate peripheral velocity of the order of 300 m/sec., with a consequent very low noise level. However, in order to supply the duct 11 with air of sufficient pressure, the fan 1 must operate with a compression ratio of the order of 1.55. In order to achieve this compression ratio with blading of such low peripheral velocity, it is necessary to use a large number of blades. To avoid the difficulties of attaching such a large number of blades to the small diameter hub 3, and to avoid the obstruction which this number of blades would create upstream of the compressor, the blading is split into two portions, namely outer blading 12 comprising a large number of blades (45 in the present embodiment), the roots of which are fixed in a rim 13 located upstream of the casing 7, and inner blading 14 with a small number of blades (9 in the embodiment illustrated) articulated at the blade roots to the hub 3 and at the blade tips to the rim 13. Between the inner blading 14 and the compressor 2 is a stator blading 30.

The assembly of the blades 12 and 14 is illustrated schematically in FIG. 3. Each of the blades 15 of the outer ring 12 is provided with a trapezoidal-section root 16 which is inserted into a longitudinal groove of corresponding section 17, machined in the radially outer face of the rim 13, in order to form a dovetail assembly. Each of the blades 18 of the inner ring 14 is provided with a tip 19 presenting lugs 20 spaced axially and directed radially outwards, and with a root 21 presenting lugs 22 spaced axially and directed radially inwards. The lugs 20 engage between and around circular and axially spaced ribs 23 on the radially inner face of the rim 13, and are pivotally attached thereto by means of a pin 24 passing through aligned bores in both lugs and ribs. The pivotal assembly of the root of each blade 18 is effected in similar manner by means of a pin 25 passing through circular and axially spaced ribs 26 formed at the periphery of the hub 3, and through the lugs 22 which are engaged around and between said ribs. The pins 24 and 25 are disposed parallel to the common rotational axis X X' of the hub 3 of the rotor 5. The blades 18 are assembled so that they are all inclined to the hub 3 in the same direction and through the same angle in relation to the circumference, that is to say so that the plane passing through the pins 24 and 25 of one and the same blade 18 is tangential to an imaginary cylinder 27 of axis X X' (see FIG. 4).

From a consideration of FIG. 4, it will be seen that when the hub 3 is rotated in the direction of the arrow F, the blades 18 of the inner ring 14 transmit the torque to the rim 13 and are simply subjected to a tensile force. Under the effect of the centrifugal forces applied to it by the outer blading 12, the rim 13 expands elastically and this expansion is not resisted since the rim 13 is free to expand due to the pivotal assembly of the blades 18. In other words, considering FIG. 4, it will be seen that the rim 13 expands to occupy the position shown in broken lines at 13a, the blades 18 pivoting about their axes defined by the pins 24 and 25 in order to adopt the positions shown in broken lines at 18a. This displacement does not subject the blades 18 to any bending stress. It should be noted that FIG. 4 is schematic, and the expansion of rim 13 to 13a has been very much magnified for emphasis.

The blades 18 of the inner blading ring 14 are set to give a "transparency condition", that is to say are set in order not to produce any aerodynamic effect upon the air entering at 9 (FIG. 1), when the engine is operating in design conditions. This "transparency condition" is illustrated by FIG. 2 which shows the diagram of the velocities at entry and exit in the case of a blade profile 18 which has a tengential velocity $\vec{U}$ in the direction of the arrow F. The air entering the blading 14 at the absolute velocity $\vec{V}$ has a relative velocity $\vec{W}$ in relation to the profiles of the blades 18, which is the resultant of $\vec{V}$ and $-\vec{U}$. The "transparency condition" is achieved by inclining the blades 18, in relation to the direction of the incident air 9, at an angle $\alpha$ whose relative velocity $\vec{W}$ is inclined visa-vis the absolute velocity $\vec{V}$. The relative velocity $\vec{W1}$ at exit from the blade is equal to $\vec{W}$, so that the resultant of this relative velocity $\vec{W1}$ and the tangential velocity $\vec{U}$ produces, at the exit from the blading 14, an absolute velocity $\vec{V1}$ equal to the absolute velocity $\vec{V}$ at the blade entry.

Because of this "transparency condition" on the part of the inner blading 14 of the fan, this blading consequently has no influence upon the airflow 9 entering the compressor, at any rate in the region of the design point. The chief advantage of this arrangement is that the jet engine, from the point of view of regulation, behaves as a twin-spool engine, that is to say it behaves as if it did not have a fan. The fan serves exclusively to supply the annular duct 11 with the requisite by-pass air. Moreover, since the by-pass ratio is independent of the compression ratio of the twin-spool compressor, it is possible very easily to modify the engine to obtain a different by-pass ratio, merely by changing the fan and without interfering with the rest of the engine. This kind of modification might for example be desirable in order to adapt the engine to a STOL aircraft which requires an engine with a high by-pass ratio.

In addition, since the blading 14 produces no aerodynamic effect, the airflow 9 exerts virtually no stress on it. Therefore, the blades 18 need only have sufficient mechanical strength to enable them to transmit the torque of the hub 3 to the rim 13, a function which subjects them to tensile stresses since they do not have to withstand any aerodynamic forces.

The present invention is applicable not only to an engine but equally to an industrial gas turbine engine, in which case it provides the following advantages:
   the centrifugal stresses are not transmitted to the central hub;
   the blades of the inner blading do not have to withstand any bending stresses;
   the assembly of the inner blading is particularly simple;
   the mass of the inner blading can be kept very low.

We claim:

1. In a gas turbine unit comprising axial-flow compressor means, a fan fitted with a hub and mounted for rotation coaxially in front of said axial compressor means, a rim mechanically connected to said hub to rotate therewith, an array of outer blading attached to said rim and extending outwardly thereof means for rotating the fan in order that the outer blading produces an annular outer airflow surrounding the compressor means, and means for rotating the compressor means in order to compress an inner airflow passing between the hub and the rim and thus to supply combustion air to the gas turbine unit; and improved mode of mechanical connection of the rim to the hub comprising a plurality of blades each connected at its tip and root, respectively, to said rim and to said hub, for limited pivotal movement about pivot axes extending parallel to the axis of rotation of said hub, said blades all being inclined in the same direction and at the same angle in relation to the hub circumference whereby said pivoted blades can accommodate to expansion and contraction of said rim under inertial and thermal forces.

2. A gas turbine unit as in claim 1 wherein each of said pivotally mounted blades is oriented at a setting angle selected to correspond when the unit is operating under design condition with the relative direction of said inner airflow considered in relation to said blades, whereby said blades are in a thrust-free condition, with respect to said airflow under said design conditions.

3. A gas turbine unit as claimed in claim 2, for an aircraft by-pass type gas turbine jet engine, wherein the means for driving said compressor means is a turbine and the means for driving said fan is a separate turbine.

4. A gas turbine unit as claimed in claim 11, wherein said separate turbine is adapted to drive said fan at a speed imparting to the outer blading a peripheral velocity sufficiently low as to produce a very low noise level, and the outer blading comprises a sufficient number of blades to achieve in operation a substantial compression ratio.

5. A gas turbine as in claim 4 wherein each of said pivotally mounted blades extends between said hub and said rim at an angle at least slightly inclined from a radius passing from the axis of fan rotation through a pivot axis of such blade.

6. A gas turbine as in claim 5 wherein said blades are inclined from root to tip at an angle having a direction opposite to the direction of fan rotation whereby the forces acting on said blades during fan rotation are substantially in tension.

* * * * *

UNITED STATES PATENT OFFICE
CERTIFICATE OF CORRECTION

Patent No. 3,768,933          Dated October 30, 1973

Inventor(s) Jean Georges BOUILLER et al

It is certified that error appears in the above-identified patent and that said Letters Patent are hereby corrected as shown below:

Column 4, Claim 1, line 31, after "thereof", insert a semicolon.

Column 4, Claim 4, line 58, change "11" to -- 3 --.

Signed and sealed this 12th day of March 1974.

(SEAL)
Attest:

EDWARD M. FLETCHER, JR.          C. MARSHALL DANN
Attesting Officer                Commissioner of Patents